Jan. 12, 1971   H. SZCZEPANSKI   3,555,475
PERMANENTLY-MAGNETIC BALL WITH MULTIPLE POLARITY
DISTRIBUTED OVER ITS SURFACE
Filed March 25, 1968
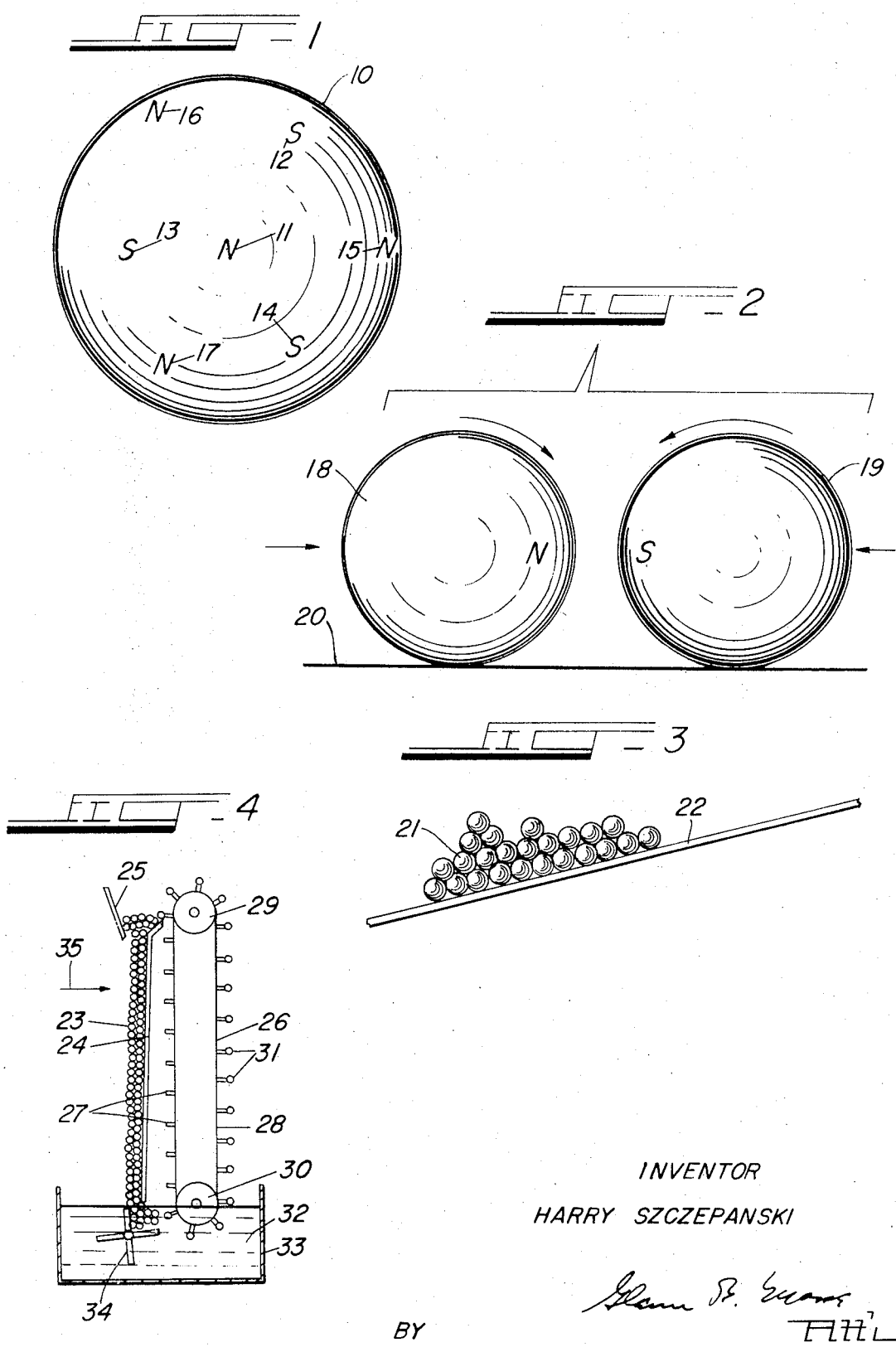
INVENTOR
HARRY SZCZEPANSKI United States Patent Office 3,555,475
Patented Jan. 12, 1971

3,555,475
PERMANENTLY-MAGNETIC BALL WITH MULTIPLE POLARITY DISTRIBUTED OVER ITS SURFACE
Harry Szczepanski, 755 Oakleigh NW.,
Grand Rapids, Mich. 49504
Filed Mar. 25, 1968, Ser. No. 715,868
Int. Cl. H01f 7/02
U.S. Cl. 335—306                              2 Claims

ABSTRACT OF THE DISCLOSURE

A permanently magnetic ball having multiple polarity distributed over its surface so that each pole is most closely surrounded by opposite polarity.

SUMMARY OF THE INVENTION

A number of applications have been found for spherical objects having some degree of permanent magnetism. These balls, whether solid or hollow, will exhibit either attraction or repulsion, depending upon the particular orientation of the poles that most closely present themselves to each other as the two objects are brought together. In other words, a particular pair of these balls might come together under certain conditions where two similar poles would be close to the point of contact. Under these conditions, the two balls would repel each other. A slight relative angular displacement of the balls, however, might bring poles of opposite polarity close together, which would produce an attraction tending to hold the balls together. Given their freedom, a group of these balls will exhibit a rather erratic pattern of movement, resulting from the continually varying attraction-repulsion forces that are continually changing as the balls roll. These characteristics are well known, and are frequently found in toys of various description. The following United States patents illustrate magnetic elements of interest in connection with this development: MacKnight, 1,494,070, 1924; Goldberg, 2,391,563, 1945; Zimmerman, et al., 2,570,625, 1951; Neal, 3,102,362, 1963; Baermann, 3,208,296, 1965.

The present invention establishes a pattern of polarity distributed over the surface of the spheres which increases their attraction-repulsion characteristics, and renders these characteristics more regularly distributed over the surface. This feature makes it possible to predict more accurately the behavior of each spherical element in a mass, and facilitates the orientation of each spherical element within the mass. Each pole of a particular north or south polarity is most closely surrounded by poles of opposite polarity. In other words, the poles are arranged so that the poles that are closest together are of opposite polarity. This arrangement tends to provide the maximum average flux density for a given degree of magnetic retention of the material of the spherical element. The arrangement also results in a minimum angular orientation of the balls to permit opposite-polarity alignment, and also increases the attraction-repulsion factor when the balls cannot be aligned within a mass to precisely present opposite poles to each other.

DETAILED DESCRIPTION

The several features of the invention will be analyzed in detail through a discussion of the particular embodiments illustrated in the accompanying drawing. In the drawing:

FIG. 1 is a view of a ball of permanently-magnetic material, showing the distribution of polarity over one particular hemisphere.

FIG. 2 is a diagram showing the presentation of polarity as two balls of the type shown in FIG. 1 approach each other.

FIG. 3 shows a mass of balls of the type shown in FIG. 1 holding themselves in position on an inclined plane.

FIG. 4 shows an application of the magnetic characteristics of the balls shown in FIG. 1 as a self-contained filter mass.

The ball 10 in FIG. 1 is preferably formed of a plastic material of any desired type, in which particles of other material are embedded which exhibit permanently-magnetic qualities. Plastic materials with such inclusions are well-known, and are used in many applications. Applicant has found a variety of uses for a hollow sphere of approximately the size and structure of a common Ping-pong ball. A sphere of practically any diameter can be processed by standard magnetic equipment to induce polarity at selected places around the surface of the sphere, and FIG. 1 shows the preferred disposition in polarity on a ball of approximately the size and structure of a common Ping-pong ball. A north pole 11 may be considered as a central reference point. The south poles 12–14 are arranged on a meridian with respect to the axial pole 11 (by assumption), with the meridian of the poles 12–14 being approximately 45 degrees from the axis occupied by the north pole 11. The north poles 15–17 are disposed on an equatorial meridian with respect to the axis occupied by the north pole 11. With this arrangement, each of the poles is most closely surrounded by poles having a polarity which are opposite to it. The disposition of poles on each latitude meridian is such that it is located on a longitude meridian half way between the closest poles of the adjacent latitude meridian. In this arrangement, there is a minimum of common-polarity interference, and a maximum resulting average flux density over the surface of the sphere 10.

FIG. 2 shows the behavior of two balls similar to the ball 10 shown in FIG. 1. The balls 18 and 19 are shown rolling toward each other. At the particular position illustrated in FIG. 2, a north pole on ball 18 is directly opposite a south pole on ball 19. Under these conditions, the balls will be drawn toward each other. As they move further, with the resulting rotation producing relative angular displacement, it is quite possible that a point might be reached when poles of the same polarity are presented to each other. Under these conditions, the balls 18 and 19 would be repelled from each other. Given freedom to move over the surface 20, the balls 18 and 19 will tend to orient themselves with respect to each other so that opposite polarity is provided as closely as possible to the point of contact. This will be particularly true if some exterior force at least initially crowds the balls 18 and 19 together, without completely blocking their freedom to align themselves within the mass. Having once assumed a position of relative alignment, balls such as 18 and 19 will exhibit a tendency to hold together in a mass as shown in FIG. 3. The mass 21 is composed of a group of balls, each of which is of the type shown in FIG. 1. This, mass, because of the forces holding it together, is able to retain its position on the inclined plate 22. The forces tending to draw the balls together generate a sufficient friction to inhibit free rolling, with the resulting ability of the mass to hold its own position.

The arrangement shown in FIG. 4 is another application of this ability of a mass of the magnetized balls to hold itself together. A filter screen 23 is formed by a mass of balls moving downwardly by the force of gravity along the perforate panel 24. These balls move from the hopper area 25, where they are placed by the vertical conveyor 26. This conveyor has a group of permanently-magnetic studs 27 mounted on an endless belt 28 carried by the sprockets 29 and 30. The magnetic studs 27 will pick up individual balls 31 from the liquid 32 in the cleaning tank 33. These balls have been moved over into a position for engagement with the magnetic studs 27 by the paddle wheel 34, which receives them as they move downwardly past the bottom of the locating panel 24. The system shown in FIG. 4 provides a continuously-recirculating movement of the balls to present impingement surfaces for gases moving in the direction of the arrow 35, and the wet surface the balls will tend to entrap foreign particles and also soluble gaseous components. The recirculation movement through the bath within the tank 33 continually provides a cleaning action so that contaminants are accumulated in the tank 33.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A plurality of spherical members arranged in unrestrained free disposition relative to each other, each of said members at least partially of permanently magnetic material and having multiple polarity distributed over the surface thereof in a pattern wherein each pole is most closely surrounded by poles of opposite polarity to said pole such that only a minimum angular orientation of said spherical members relative to each other is necessary to permit opposite-polarity alignment, whereby said plurality of spherical members tends to form a cohesive mass.

2. A plurality of spherical members as defined in claim 1, wherein said poles are arranged on meridians, each meridian containing a particular polarity which is opposite to the poles on the adjacent meridans, and the spacing between said meridians is less than the spacing between the poles along said meridians.

References Cited

UNITED STATES PATENTS

| 2,277,057 | 3/1942 | Bach | 335—203X |
| 3,136,720 | 6/1964 | Baermann | 210—222 |
| 3,139,567 | 6/1964 | Atkinson | 335—284 |
| 3,206,657 | 9/1965 | Moriya | 210—222X |
| 3,411,120 | 11/1968 | Miyata | 210—223X |

FOREIGN PATENTS

| 961,725 | 6/1964 | Great Britain | 335—303 |

GEORGE HARRIS, Primary Examiner

U.S. Cl. X.R.

210—222